F. G. HUGHES.
CLUTCH MECHANISM.
APPLICATION FILED SEPT. 11, 1916.

1,341,983.

Patented June 1, 1920.

INVENTOR:
Frederick G. Hughes,
BY
his ATTORNEY.

UNITED STATES PATENT OFFICE.

FREDERICK G. HUGHES, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

CLUTCH MECHANISM.

1,341,983. Specification of Letters Patent. Patented June 1, 1920.

Application filed September 11, 1916. Serial No. 119,366.

*To all whom it may concern:*

Be it known that I, FREDERICK G. HUGHES, a citizen of the United States, residing at Bristol, county of Hartford, State of Connecticut, have invented a certain new and useful Clutch Mechanism, of which the following is a full, clear, and exact description, such as will enable others skilled in the art to which it appertains to make and use the same, reference being had to the accompanying drawings, forming part of this specification.

My invention relates to clutch mechanisms, and more particularly to such mechanisms especially adapted for use in coaster brakes.

One object is to provide a durable and commercially practicable clutch of the type which has positive gripping action and yet can be operated smoothly and without clash or lost motion; and a further object is to avoid chattering of the parts.

To these ends, and also to improve generally upon devices of the character indicated, my invention consists in the various matters hereinafter described and claimed.

Figure 1:
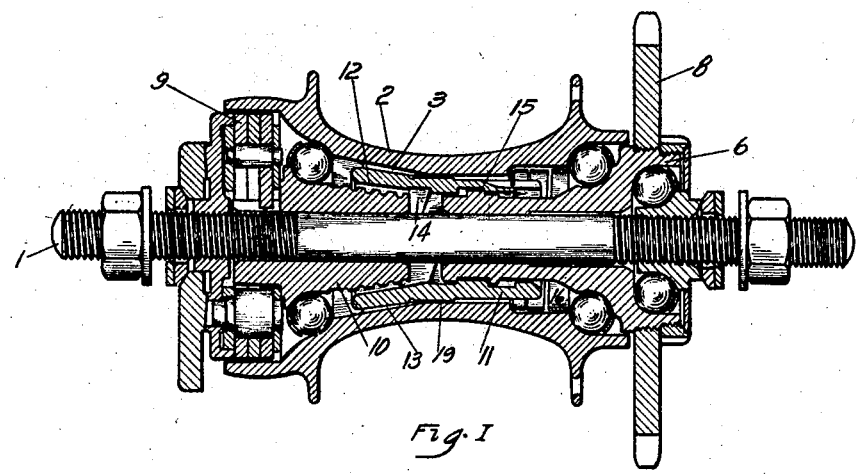
Figure 1 is a longitudinal elevation, chiefly in section, of a coaster brake provided with my invention, the parts being shown in clutching position.

These drawings illustrate the present invention applied to the well known coaster brake like, or substantially like, that disclosed in patent to Albert F. Rockwell, No. 745,524, granted December 1, 1903. In this coaster brake mechanism 1 is the axle, 2 the hub, 6 the driver with its sprocket wheel 8, 9 is the brake, 10 the rotatable brake-actuator, and 11 the laterally shiftable connector sleeve adapted to clutch either the hub or the brake-actuator, 16 indicating the customary lag spring; and as in said Rockwell patent, the connector is engaged by the driver through the threads 14 and 15, so that upon forward turning of the sprocket wheel the conical or tapered outer clutch surface 13 of the connector engages the correspondingly tapered inner clutch surface 3 of the hub for driving the latter, upon cessation of pedaling the connector shifts out of this clutching engagement (thereby leaving the hub free to coast), and upon backward turning of the sprocket wheel the inner clutch surface 12 of the connector first engages and then turns the brake-actuator to apply the brake. This general coaster brake structure is more fully described in the above mentioned Rockwell patent.

Figure 2:
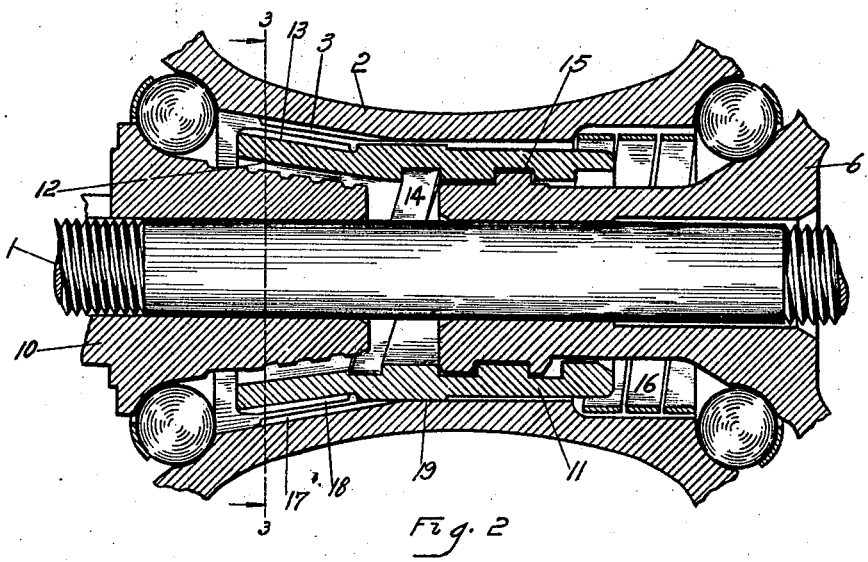
Fig. 2 is an enlarged view of the central portion of the mechanism shown in Fig. 1, the parts being shown out of clutching position.
Figure 3:
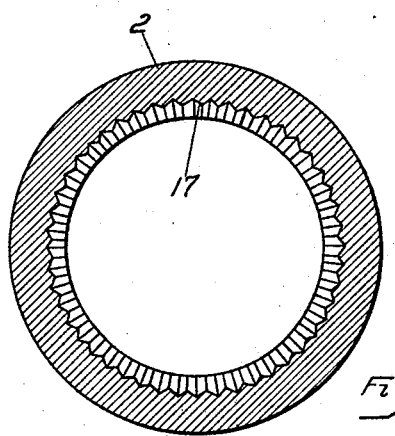
Fig. 3 is a cross-section on about the line 3—3 of Fig. 2, looking in the direction of the arrows.
Figure 4:
Fig. 4 is a greatly enlarged fragmentary detail of the clutch teeth.

In these coaster brake mechanisms it is important that the driving clutch be positive and certain in its gripping action, so that slipping between the connector and the hub is rendered impossible during driving, it is also important that the connector should glide smoothly into and out of its hub-clutching position so that no clash or jar results and the rider gets no objectionable lost-motion, or lunge, upon his pedals, and it is highly important that the mechanism be strong and durable so that chipping or ripping of the metal parts is avoided, because any such chips, of course, work into the bearings, into the threads, and between the clutch faces, and thus impair or destroy the action of the mechanism. To effect such results I provide the tapering clutch elements 2 and 11 with mating longitudinal teeth 17 and 18, these teeth not only being sharp and relatively low and V-shaped with their bases adjoining each other, but also being long and preferably straight, and, as particularly shown in Fig. 2, having the clutching edges of the teeth of one clutch element substantially parallel with the clutching edges of the coacting teeth of the other clutch element, so that, as the tapering and toothed portion of the connector 11 moves laterally into or out of the corresponding socket of the hub 2, mating teeth engage or disengage each other along substantially the whole length of the tooth edges simultaneously, whereby, as substantially the whole length of any tooth is engaged with its mating tooth whenever there is any engagement at all and no small points or portions of any tooth are separately presented for contact with the rotating mating teeth, chipping and bending of the teeth is avoided; the parallelism between the clutching edges of the respective sets of relatively long teeth insures engagement or disengagement along substantially the whole length of any such tooth edge simultaneously. Thus, when the parts are in clutching position, as shown in Fig. 1, there is the positive driving engagement of the teeth as well as the engagement of the tapered surfaces, but movement of the connector into such clutching position is smooth and without objectionable lost motion upon the pedals, because the low, sharp teeth travel into and out of engagement with slight motion and even if the sharp edges should come together they do so without jar and are at once deflected from each other. Furthermore, bending or chipping or ripping off of the teeth is avoided because, the teeth being long and having their edges substantially in the parallelism above described, no projecting surfaces are presented for chipping or bending when the clutch elements come together, and the driving strain upon each long tooth is distributed over a large area. This structure thus presents all of the advantages of a smoothly-engaging tooth clutch and at the same time obviates both the highly detrimental bending of teeth (which bent teeth interfere with smooth engagement) and the equally detrimental chipping or ripping off of teeth (which chips or ripped teeth prevent the proper operation of the remaining parts of the mechanism).

In some mechanisms which employ clutches a certain looseness is sometimes desirable between the shiftable clutch element and the part which supports it. For example, in a coaster brake a certain looseness is desirable between the connector 11 and the threaded sleeve of the driver 6. But when the parts are in the unclutching position shown in Fig. 2 (as in coasting) this looseness might permit the teeth 18 of the clutch connector 11 to drop upon the teeth 17 of the rotating hub 2 and the result would be a very objectionable chattering as well as unnecessary wear upon the teeth. To obviate this I prefer to provide a somewhat narrow circumferential rib 19 about the connector 11 and preferably adjacent the inner end of the toothed, tapered clutch portion of such connector, so that as the connector sags upon its supporting driver sleeve and the extending toothed end of the connector tends to fall, the rib engages the hub before the teeth can strike each other, and wear and chattering of such teeth is thus prevented. The narrow rib is sufficient to prevent the striking of the teeth but presents only a line contact with the hub for a very short distance (much less than the whole length of the connector sleeve 11) so that no material drag of the connector upon the hub results during coasting, any material drag, of course, being detrimental to the coasting action.

Thus the present clutch mechanism, especially useful in coaster brakes, not only provides for firm and positive gripping between the clutch members and permits these members to firmly seat together without jar or objectionable lost motion, but also provides a strong and commercially practicable structure in which the strain upon the clutch teeth is distributed over a large area and bending and chipping and ripping off of the teeth are obviated. Furthermore, chattering of the teeth is also avoided in a simple manner not detrimental to the desired operation of the remainder of the mechanism.

Having thus described my invention, what I claim as new and desire to secure by Letters Patent is:

1. In a clutch mechanism, a supporting element, a clutch element relatively loosely supported thereon, a second clutch element surrounding said first mentioned clutch element, teeth between said clutch elements, and a projection upon one of said clutch elements and adapted to engage the other thereof before said teeth can strike when the clutch elements are out of clutching position; substantially as described.

2. In a clutch mechanism, a supporting element, a clutch element relatively loosely supported thereon and having a tapered portion provided with clutch teeth, a second clutch element surrounding said first clutch element and having a tapered portion provided with clutch teeth and adapted to receive said tapered portion of said first clutch element, and a rib upon one of said clutch elements and adapted to engage the other thereof before said teeth can strike when out of clutching position; substantially as described.

3. In a clutch mechanism, a supporting element, a clutch sleeve relatively loosely supported thereon and having a tapered portion provided with clutch teeth, a second clutch element about said sleeve and having a toothed tapered portion adapted to receive said tapered portion of said sleeve, and a circumferential rib upon said sleeve near the inner end of the said tapered portion thereof and adapted to engage said second clutch element before said teeth can strike when out of clutching position; substantially as described.

In testimony whereof I hereunto affix my signature.

FREDERICK G. HUGHES.